Figure 1:
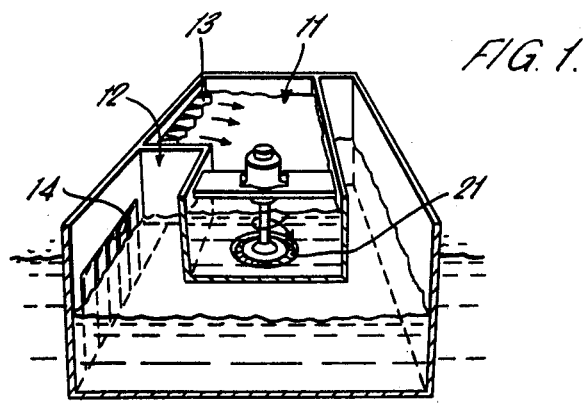

United States Patent [19]

Russell

[11] 4,141,670

[45] Feb. 27, 1979

[54] DEVICE FOR EXTRACTING ENERGY FROM WATER WAVES

[75] Inventor: Robert C. H. Russell, Wallingford, England

[73] Assignee: The Secretary of State for Energy, in Her Britannic Majesty's Government of the United Kindgom of Great Britain and Northern Ireland, England

[21] Appl. No.: 802,908

[22] Filed: Jun. 2, 1977

[30] Foreign Application Priority Data

Jun. 9, 1976 [GB] United Kingdom ............... 23951/76

[51] Int. Cl.² .............................................. F03D 7/00
[52] U.S. Cl. ........................................... 415/2; 415/7; 60/497; 290/53; 417/330
[58] Field of Search ........................................ 415/2–4, 415/7; 417/330, 331; 290/53; 60/495, 497, 501, 502

[56] References Cited

U.S. PATENT DOCUMENTS

| 1,143,118 | 6/1915 | Hoffman | 415/7 |
|---|---|---|---|
| 1,338,326 | 4/1920 | Peck | 415/7 |
| 1,782,277 | 11/1930 | Smith | 415/7 |
| 1,811,565 | 6/1931 | Schwabacher | 290/53 |
| 1,962,047 | 6/1934 | Young | 60/497 |
| 2,820,148 | 1/1958 | Southwick | 290/53 |
| 4,076,447 | 2/1978 | Granath et al. | 415/2 |
| 4,076,448 | 2/1978 | Sanders | 415/2 |

FOREIGN PATENT DOCUMENTS 404027 6/1970 Australia ................................ 60/495

Primary Examiner—C. J. Husar
Attorney, Agent, or Firm—Larson, Taylor & Hinds

[57] ABSTRACT

A device for extracting energy from water waves comprises high-level and low-level reservoirs with non-return valves for permitting water from wave crests to enter the high-level reservoir (but not return) and for permitting water from the low-level reservoir to escape as a water wave trough passes but preventing entry of water from the crests into the low-level reservoir. The non-return valves operate over a vertical extent and are such as to accommodate the variation in time with depth at which water pressure changes from high on one side and low the other to low on the one side and high on the other.

9 Claims, 5 Drawing Figures

DEVICE FOR EXTRACTING ENERGY FROM WATER WAVES

The invention relates to a device for extracting energy from water surface waves and is intended, in particular, for use in extracting energy from waves on the surface of the sea.

There have been previous proposals to provide a water reservoir in which wave energy is converted into a pressure head of water held above the mean level of the sea surface by allowing the wave crests to drive into the reservoir through non-return valves.

There has recently been described a device in which the efficiency of wave energy extraction on this principle is improved by arranging a series of high and low level reservoirs with non-return flap valves which permit the wave crests to drive water into the high level reservoirs and water in the low level reservoirs to be extracted into the wave troughs.

The present invention is concerned with an improvement of the latter device and is based upon the appreciation that the non-return valves, which extend vertically over the full range of wave height which it is desired to convert, should be capable of responding to pressure changes which do not occur simultaneously at all points up and down the vertical extent of the non-return valves.

Accordingly the invention provides a device for extraction of energy from water waves comprising a structure defining at least one high-level reservoir and at least one low-level reservoir, first non-return valve means operative over a vertical extent of the high level reservoir, which first non-return valve means open to permit passage of water into the high-level reservoir but close to prevent passage of water out of the high-level reservoir, second non-return valve means operative over a vertical extent of the low-level reservoir, which second non-return valve means open to permit passage of water out of the low level reservoir but close to prevent passage of water into the low-level reservoir, the first and the second non-return valve means being adapted to respond to changes in water pressure across the valve means which occur at different times at different vertical positions up and down the vertical extent of the valve means, thereby to permit passage of water at one vertical position where the pressure difference across the valve means is in the forward direction whilst remaining closed or substantially closed at another vertical position where the pressure difference across the valve means is in the return direction.

The non-return valve means preferably comprise apertures and hinged flaps which move with the water in one direction to open the apertures and in the other direction to close the apertures.

In one arrangement according to the invention the apertures are vertically extending slits with corresponding vertically extending flaps hinged on a vertical axis. In this case the flaps are so constructed as to be capable of twisting so that they can be open at the top whilst closed at the bottom.

Alternatively the non-return valve means comprise a plurality of apertures and associated flaps hinged horizontally, of short vertical extent and arranged one above another to provide the required overall vertical extent of the non-return valve means. In this way the hinged flaps at the various vertical levels can open and close independently of one another and in response to local pressure variations.

Preferably the flaps are constructed to have a density close to that of the water in which the device is to be used. Vertically hinged flaps and horizontally hinged flaps for a high level reservoir are desirably of density slightly greater than that of the water. Horizontally hinged flaps for a low level reservoir are desirably hinged at their lower edges and constructed to have a density slightly greater than that of the water.

In one arrangement according to the invention a plurality of high-level reservoirs are intercommunicating to form a group and a plurality of low-level reservoirs are intercommunicating to form a group and a turbine is driven by water allowed to pass through it from the group of high-level reservoirs to the group of low-level reservoirs.

In another arrangement according to the invention, a series of high- and low-level reservoir pairs are arranged so as to be acted upon in sequence by crests and troughs reaching the device and, in each pair, water flows from the high-level reservoir to the low-level reservoir via a vertical axis turbine.

Figure 2:
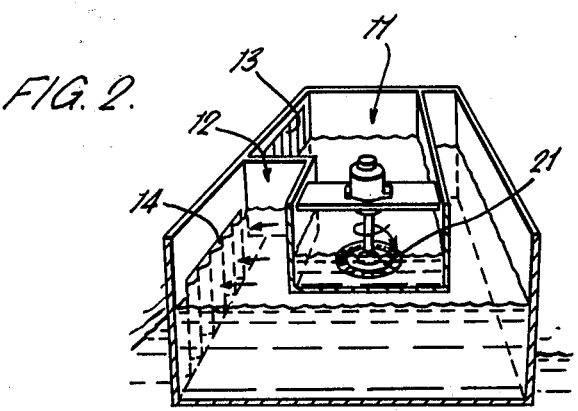
Figure 3:
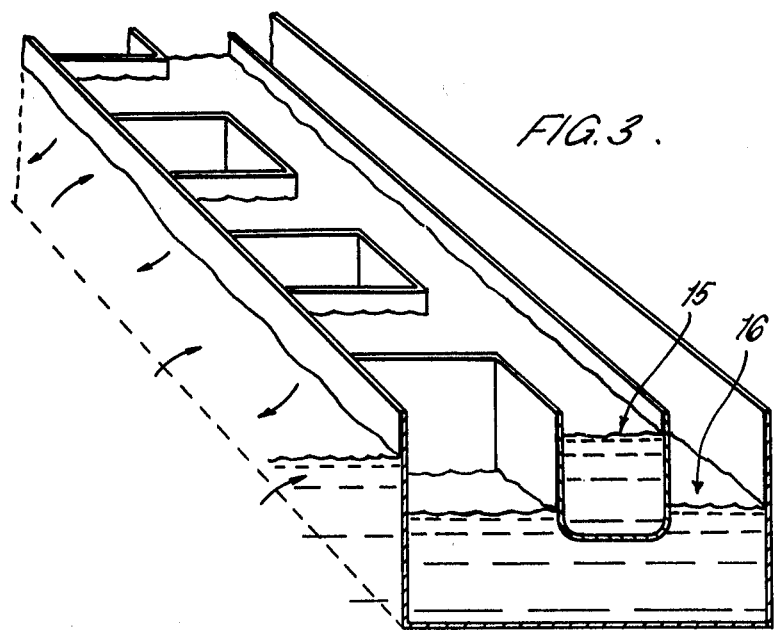
Figure 4:
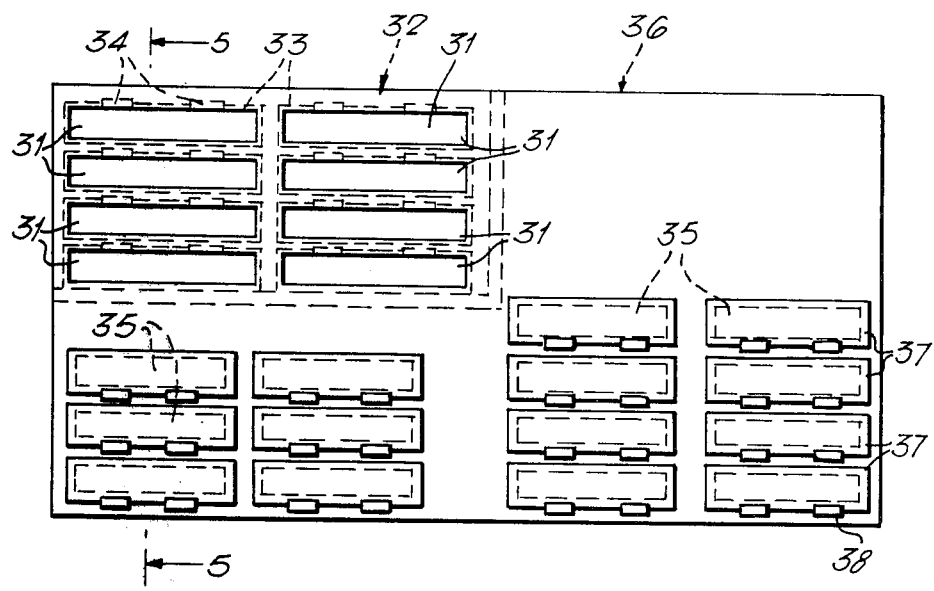
Figure 5:
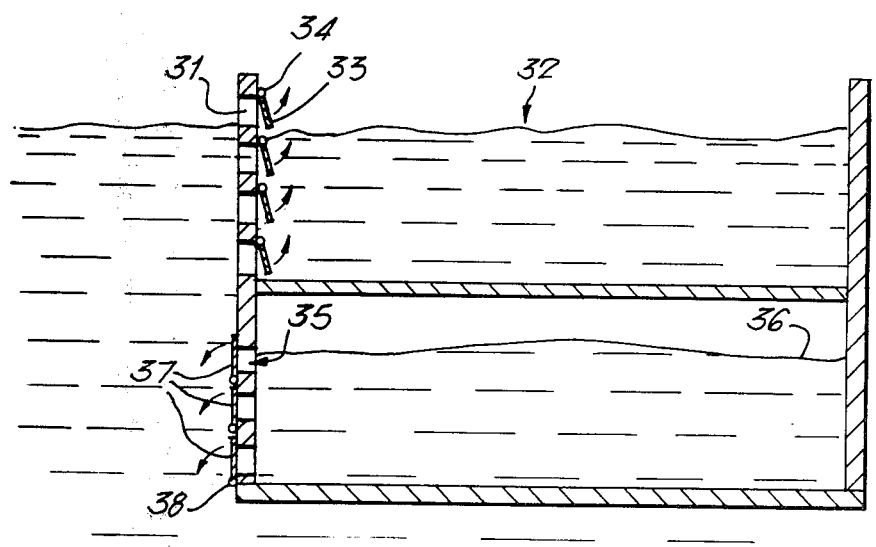

Specific constructions of apparatus embodying the invention will now be described by way of example and with reference to the drawings filed herewith, in which:

FIGS. 1 and 2 are diagrammatic perspective views, partly in section, to illustrate the principle of operation of the device, FIG. 3 is a diagrammatic perspective view, partly in section, of a device having a plurality of intercommunicating high-level reservoirs and a plurality of intercommunicating low-level reservoirs, FIG. 4 is a diagrammatic side view of part of another device, and FIG. 5 is a diagrammatic sectional view on the line 5—5 of FIG. 4.

Referring to the drawings, the device comprises a series of compartments alternately comprising (or forming part of) respectively high-level and low-level reservoirs 11, 12. As shown in FIGS. 1 and 2 a series of vertically hinged flaps 13 in the wall of the high-level reservoir 11 permit passage of water into the reservoir but prevent return of water back past the flaps 13. A corresponding series of vertically hinged flaps 14 in the wall of the low-level reservoir 12 permit passage of water out of the reservoir but prevent return of water into the reservoir. FIGS. 1 and 2 show diagrammatically a vertical axis turbine 21 arranged to be driven by flow of water from the high-level reservoir 11 into the low-level reservoir 12.

FIG. 3 shows how a plurality of compartments are arranged to provide alternate wall sections coupled via non-return valves with the high-level and low-level reservoirs respectively. The compartments forming the high-level reservoir are intercommunicating via a channel 15 (FIG. 3) whilst the compartments forming the low-level reservoir are intercommunicating via a channel 16 (FIG. 3).

Operation of the device will be apparent from FIGS. 1 and 2. As a wave crest reaches a compartment of the high-level reservoir 11, and the water level outside rises above that in the reservoir 11, the flaps 13 hinge open (FIG. 1) so that water is taken into the reservoir 11. When the outside water level falls below that in the high-level reservoir 11, the flaps 13 close (FIG. 2). As a wave trough reaches a compartment of the low-level reservoir 12, and the water level outside falls below that in the reservoir 12, the flaps 14 hinge open (FIG. 2) releasing water from the low level reservoir. When the outside water level again rises above that in the low-level reservoir 12, the flaps 14 close (FIG. 1).

FIGS. 1 and 2 show, in highly diagrammatic form a vertical axis turbine driven by water from the high-level reservoir 12.

In one arrangement, each compartment is separate and a turbine is provided in each pair of compartments between that which forms the high-level reservoir and that which forms the low-level reservoir. In the arrangement shown in FIG. 3, where the compartments are intercommunicating in groups, only one turbine would be required for each pair of groups forming respectively high- and low-level reservoirs.

In accordance with the invention, the vertically hinged flaps 13, 14 are constructed to be capable of twisting so that, for example, they can open at the top whilst remaining substantially closed at the bottom or vice-versa. For this purpose the flaps are conveniently constructed of rubber or similar material. In this way the flaps accommodate the variation in time with depth at which water pressure on one side of the flaps rises above and falls below that on the other side.

An alternative configuration, illustrated in FIGS. 4 and 5, is to hinge the flaps horizontally, each flap being of short vertical extent and arranged in series one above another, thus having an appearance similar to the slats of a venetian blind.

Referring to FIGS. 4 and 5, apertures 31 provide access to high level reservoir 32. Flow through these apertures 31 is controlled by flaps 33 hinged (e.g. at 34) horizontally. The flaps 33 are of short vertical extent so that they can open and close independently of one another to accommodate the variation in time with depth at which water pressure on one side of the flaps rises above and falls below that on the other side. The flaps 33 are also of limited horizontal extent to avoid the problem, where wave approach is not at right angles to the flaps, of a flap 33 held open by a wave crest at one end whilst the trough is already approaching the other end of the flap.

Apertures 35 provide outlets from the low level reservoir 36 and flow through these apertures 35 is controlled by flaps 37 hinged horizontally (e.g. at 38). It will be noted that these flaps 37 for the low level reservoir are hinged at their lower edge rather than at the top. The reason for this is that these flaps 37 are required to close as the water wave on the outside is rising up the side of the reservoir wall. If the flaps 37 are hinged at the top, the rising water tends to carry the flaps upwards and hold them open when they should be shut. Provided the flaps 37 are slightly buoyant, this problem is avoided or reduced by hinging at the lower edge of the flaps 37.

It is important that the valve should open from closed to wide open with the minimum flow of water and the minimum impedance to water flow. To this end the flaps, where vertically hinged, are constructed of material of density close to, but slightly above, that of the water in which the device is used. In the arrangement employing horizontally hinged flaps, there is the advantage that the weight of the flaps for the high level reservoir, or, if necessary, added weight, serves to provide a small bias towards the closed position. As mentioned above, flaps for the low level reservoir are desirably slightly buoyant (lower density than water) and are hinged at their edges. Here the buoyancy provides a small bias towards the closed position.

Choice of the dimensions of the flaps and the compartments are important. Thus, the dimension of the flaps perpendicular to the hinge should be short to reduce the water movement necessary to fully open or fully close the flap. Volume flow has therefore to be increased by increasing the number of flap valves rather than by increasing their size.

For horizontally hinged flaps, the dimension from hinge to edge must be small relative to the orbit length, that is the distance which the water particles move in executing the wave motion.

The distance between the divide walls that separate areas of inward opening valves from areas of outward-opening valves, and also separation of high-level from low-level reservoirs, should for maximum efficiency, be small compared with the average wavelength of the waves from which the device is to extract energy.

The overall size, or reach, of the reservoirs will have an optimum determined by a compromise between quantities of structural material involved and the desirability of capturing the maximum water movement from each wave.

The device may comprise a structure built on, or anchored to, the sea bed or may, alternatively be constructed in the form of a large floating structure of total size significantly greater than the average wave length.

The device has advantages over most mechanical systems designed for extraction of energy from water waves in that it is not sensitive to wave period and does not require to be tuned to suit the period of the oncoming waves. The device does benefit, however, from being tuned to an appropriate wave-height since it is desirable for maximum efficiency to pass flow through the turbines at such a rate as to maintain a certain head difference between high-level and low-level reservoirs, and this is a fraction, around half, of the waveheight at sea.

The invention is not restricted to the details of the foregoing examples. For instance, flap valves need not necessarily be employed but other forms of non-return valve may be employed provided these meet the operational requirements described above. A possibility, for example, is a honeycomb arrangement of ball valves, but it is doubtful if these could compete with flap valves in respect of the requirements for maximum volume flow and minimum water movement from fully closed to fully open positions.

I claim:

1. A device for extraction of energy from water waves comprising a structure defining at least one high-level reservoir and at least one low-level reservoir, first non-return valve means operative over a vertical extent of the high level reservoir, which first non-return valve means open to permit passage of water into the high-level reservoir but close to prevent passage of water out of the high-level reservoir, second non-return valve means operative over a vertical extent of the low-level reservoir, which second non-return valve means open to permit passage of water out of the low-level reservoir but close to prevent passage of water into the low-level reservoir, the first and the second non-return valve means operating at one vertical position at least partly independently of operation at another vertical position thereby to respond to changes in water pressure across the valve means which occur at different times at different vertical positions up and down the vertical extent of the valve means, and to permit passage of water at one vertical position where the pressure difference across the valve means is in the forward direction while remaining closed or substantially closed at another vertical position where the pressure difference across the valve means is in the return direction and power generating means driven by the flow of water from the high-level reservoir to the low-level reservoir under the pressure head established by the difference in water levels in the respective reservoirs.

2. A device as claimed in claim 1, wherein the non-return valve means comprise apertures and hinged flaps which move with the water in one direction to open the apertures and in the other direction to close the apertures.

3. A device as claimed in claim 2, wherein the apertures are vertically extending slits and the flaps are correspondingly vertically extending and are hinged on a vertical axis, the flaps being so constructed as to be capable of twisting so that they can be open at the top whilst closed at the bottom.

4. A device as claimed in claim 2, wherein the non-return valve means comprise a plurality of apertures and associated flaps hinged horizontally, of short vertical extent and arranged one above another to provide the required overall vertical extent of the non-return valve means.

5. A device as claimed in claim 2, wherein the flaps are constructed to have a density close to that of the water in which the device is to be used.

6. A device as claimed in claim 3, wherein the flaps are constructed to have a density close to but slightly greater than that of the water in which the device is to be used.

7. A device as claimed in claim 4, wherein the flaps for the high level reservoir are hinged along their upper edges and are constructed to have a density close to but slightly greater than that of the water in which the device is to be used and the flaps for the low level reservoir are hinged along their lower edges and are constructed to have a density close to but slightly less than that of the water in which the device is to be used.

8. A device as claimed in claim 1, wherein a plurality of high-level reservoirs are intercommunicating to form a group and a plurality of low-level reservoirs are intercommunicating to form a group and a turbine is driven by water allowed to pass through it from the group of high-level reservoirs to the group of low-level reservoirs.

9. A device as claimed in claim 1, wherein a series of high- and low-level reservoir pairs are arranged so as to be acted upon in sequence by waterwave crests and troughs reaching the device and, in each pair, water flows from the high-level reservoir to the low-level reservoir via a vertical axis turbine.

* * * * *